United States Patent Office 3,453,173
Patented July 1, 1969

3,453,173
POLYOLEFIN-POLYACRYLONITRILE LAMINATE
AND METHOD OF MAKING SAME
Ralph E. Isley, Northfield, and Richard C. Adams, Chardon, Ohio, assignors to The Standard Oil Company, Cleveland, Ohio, a corporation of Ohio
No Drawing. Filed Aug. 11, 1965, Ser. No. 478,990
Int. Cl. B32b 27/40, 27/32, 27/30
U.S. Cl. 161—190
5 Claims

ABSTRACT OF THE DISCLOSURE

A laminate having a superior heat-seal strength and excellent barrier properties to the transmission of gases is prepared from a film of a polyolefin such as polyethylene or polypropylene, and a film of an acrylonitrile polymer, by extruding and bonding the polyolefin in the molten state onto the acrylonitrile polymer film which has previously been surface-treated with an adhesive.

---

This invention relates to laminated structures comprising laminae of certain synthetic film-forming polymers and more particularly pertains to laminated film structures comprising laminae of a polyolefin and an acrylonitrile polymer and to the method for their preparation.

It is an object of this invention to provide laminated structures and particularly laminated sheets and films which are excellent barriers for the transmission of gases. It is another object to provide laminated structures which are excellent barriers for the transmission of vapors. Another object is the provision of laminated structures which are strong, tough and chemically resistant. Still another object is the provision of strong, tough and chemically resistant structures which are heat sealable.

That the foregoing and other objects have been accomplished by this invention will become apparent from the following description and illustrative examples.

The laminated structures of this invention are composed primarily of at least one surface of a polyolefin adhered to at least one surface of an acrylonitrile polymer. The foregoing surfaces of said polyolefin and said acrylonitrile polymer may be continuous or discontinuous as illustrated by a smooth film surface on the one hand and a surface of a foam, woven fabric or nonwoven fabric on the other. Preferably, the laminated structures comprise at least one film of a polyolefin in which at least one surface of the polyolefin film is adhered to at least one surface of an acrylonitrile polymer film. The films embodied in this invention are preferably from about 0.1 mil to 15 mils in thickness and preferably from 0.25 to 10 mils in thickness. Surprisingly, the heat-sealed laminae of the present invention, when sealed through the polyolefin lamina exhibits stronger heat-seal bond than does either the acrylonitrile polymer film or the polyolefin film when heat-sealed to itself.

The polyolefins useful in the present invention are preferably the solid, resinous polymers of alpha-monoolefins and these include polyethylene, polypropylene, the polybutenes, the polypentenes, the polyheptenes, the polyhexenes, and the like including polymers of at least one alpha-olefin having the structure

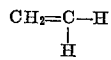

wherein R can be hydrogen or an alkyl group having from 1 to 6 carbon atoms. Most preferred in the present invention are homopolymers and copolymers of ethylene and propylene. The polyolefins useful herein also may be atactic, isotactic, syndiotactic, crystalline or amorphous or any combination of these structures.

The acrylonitrile polymers and copolymers useful in the present invention are those resinous polymers containing at least about 90% by weight of polymerized acrylonitrile and preferably those containing at least 95% by weight of polymerized acrylonitrile with the remainder being a polymerized vinyl monomer which is copolymerizable with acrylonitrile. The vinyl monomers which comprise the additional 5 to 10% of the acrylonitrile polymer may be monoalkenyl or polyalkenyl monomers or a combination of both. Most preferred in the present invention are acrylonitrile homopolymers and copolymers prepared with up to about 5% by weight of at least one polyalkenyl monomer.

The polyalkenyl monomers useful in the acrylonitrile polymers of this invention include those having at least two polymerizable olefinic groups per molecule. Such monomers include allyl acrylate, allyl methacrylate, diallyl maleate, diallyl fumarate, ethylene glycol dimaleate, diallyl itaconate, methallyl acrylate, tetramethylene diacrylate, divinyl ether, the divinyl ether of butanediol-1,4, diallyl ether, dimethallyl ether, ethylene glycol dimethacrylate, 1,1,1-trimethoxypropanedimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinyl biphenyl, divinyl naphthalene, divinyl benzene, trivinyl benzene, diallyl benzene, diisopropenyl benzene, allyl allyloxyacetate, ethylidene dimethacrylate, methylene dimethacrylate, diallyl melamine, diallyl isomelamine, triallyl melamine, triallyl aconitate, triallyl phosphate, tetraallyl silane, tetravinyl silane, diallyl divinyl silane, tetraallyl germane, tetravinyl tin, tetravinyl germane, triacryloyl perhydrotriazine, trimethacryloyl perhydrotriazine, divinyl spirobi, methylene-bis-acrylamide, ethylene diacrylamide, N-allyl acrylamide, N,N-diallyl acrylamide, N,N-dimethallyl methacrylamide, polyallyl ethers of polyhydric alcohols such as tetraallyl pentaerythritol, hexa-allyl sucrose, hexa-allyl inositol, hexa-allyl sorbitol, hexavinyl sucrose, and the like.

Monoalkenyl monomers useful in the acrylonitrile polymers of this invention include the acrylate esters, such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters, such as methyl methacrylate, ethyl methacrylate, the propyl methacrylates, the butyl methacrylates, the amyl methacrylates, the hexyl methacrylates, cyclohexyl methacrylates, phenyl methacrylate, the decyl methacrylates and the like; vinyl esters such as vinyl acetate, vinyl propionate, the vinyl butyrates, vinyl benzoate, isopropenyl acetate, and the like; the vinyl aromatics such as styrene, alpha-methyl styrene, vinyl toluene, the vinyl xylenes, the vinyl naphthalenes, isoproppenyl benzene, and the like; vinyl amides, such as acrylamide, methacrylamide, N-methyl acrylamide, vinyl benzamide, N-vinyl pyrrolidone, and the like; the vinyl halides, such as vinyl chloride, vinyl bromide, vinyl fluoride, vinylidene chloride, vinylidene fluoride, dichlorodifluoro ethylene, tetrafluoroethylene, and the like; olefins, such as ethylene, propylene, isobutylene, butene-1 and the like.

The acrylonitrile polymers embodied herein can be prepared in any convenient manner, such as by batch, bulk, solution, emulsion or suspension polymerization techniques, all of which are known in the art. The preferred film and other shaped forms of the acrylonitrile polymers useful in the laminates of this invention are preferably oriented and more preferably biaxially oriented by means more full described and claimed in the copending U.S. patent application of R. E. Isley, R. C. Adams and L. E. Ball, Ser. No. 377,041, filed June 22, 1964, and the copending U.S. patent application of L. E. Ball, Ser.

No. 421,612, filed Dec. 28, 1964, both of which are incorporated herein by this reference.

The laminated structures embodied herein may be prepared by one or more of several conventional procedures. In one procedure, the polyolefin surface and the acrylonitrile polymer surface are brought together and adhered to one another by means of an adhesive. The surface of either or both of the laminae may also be treated in some manner to make them more adherent. For instance, the acrylonitrile polymer surface can be much more adherent by treatment with a gaseous mixture of boron trifluoride and an oxidizing agent as described in British Patent No. 834,196. The surfaces of either or both of the acrylonitrile polymer films and the polyolefin film can also be flame-treated, treated by corona discharge, as disclosed in U.S. Patents Nos. 2,632,921; 2,648,097 and 3,018,189 and in British Patent No. 986,680, or treated with a strong oxidant such as nitric acid to make them more adherent.

In applying a film of a polyolefin to an acrylonitrile polymer film by another procedure, the normally solid polyolefin may be extruded through a die and while in the molten state into contact with the acrylonitrile polymer film which may have previously been surface-treated with an adhesive or in some other manner to improve its surface adherency. The molten polyolefin film is then pressed into bonding engagement with the acrylonitrile polymer web and simultaneously chilled to a temperature below its solidification point by passing the coated web between two parallel rolls.

According to another process for preparing the laminates, adhesives such as an ethylene-vinyl acetate interpolymer, as described in U.S. Patent No. 2,200,429, the rubber solutions described in U.S. Patent No. 2,664,378, or adhesive materials, referred to in U.S. Patents Nos. 2,869,197, 2,994,632, 2,999,782, 3,049,455, 3,179,554, can be readily sandwiched between the laminae embodied in this invention on a roll mill or calendar, the rolls of which are maintained at a temperature sufficiently high to cause the adhesive to fuse and adhere to the contacted surfaces of the laminae.

By "heat sealability" is meant the ability of polyethylene to bond to itself by conventional heat sealing means, such as bringing together two polyethylene areas for about three seconds at about 350° F. under a pressure of about 40 p.s.i. Heat sealability find importance, for example, in effecting closure of polyethylene-coated bags. The seal strength of heat-sealed laminates is determined by pulling the two heat-sealed laminates apart at the seal by pulling at an angle of 180°.

The sealing step can be effected by simultaneously pressure contacting and heating the polyolefin coated surfaces of the laminated structure. This can be accomplished, for example, by passing two layers of film with the polyolefin coated surfaces lying together, between two pressure rollers, one or both of the rollers being heated. The seal thus formed is known as a flat seal.

Edge sealing can be accomplished, for example, by clamping two layers of the film between steel plates, a portion of the contacted layers projecting outside the plates. The contacting surfaces of the film projecting outside the plates are coated with the polyethylene. That portion of the film layers projecting from the steel plates is radiant heated.

The heating temperature employed in the sealing step is sufficiently high so that the layers of the film to be sealed together will be molten. Therefore, the heating temperature is normally above 300° F. The temperature of the heat source employed will vary considerably depending upon the procedure utilized. For example, when heat-sealing is effected by conduction, the temperature of the source will be essentially that required for the seal. When sealing by radiant heat, the temperature of the source will be sufficiently high to provide the required temperature at the seal point. The time of heating will vary, depending upon the thickness of the film being sealed, the material from which the film is fabricated, and the temperature employed. The heating time will generally be in the range from 0.5 to 100 seconds.

The laminated products of this invention, either used alone or in conjunction with one or more layers of flexible sheet materials, such as paper or cloth, are also particularly adaptable for the construction of containers such as boxes, cans, tubes, collapsible tubes, such as for tooth paste, foods including ketchup, cheese, meats, coffee, and in the packaging of paints, etc. When used in a clear, transparent condition without any opaque materials, such as paper, cloth, etc., the laminates of this invention have excellent gas barrier properties and they also have a definite advantage over similar articles made of metal foil, in that their transparency permits one to see the contents of the container without opening it. These laminated products may also be used in the preparation of drug and medicine ampules because they have much greater resistance to moisture vapor penetration than ampulses made of gelatin, for instance. Similarly, capsules having a removable lid portion can be advantageously made for containing drugs, medicines, chemicals, foods, etc., in the form of powder, pills or tablets, etc. Bottle caps and other container closures can also be made of these component products. The laminates embodied herein are particularly useful as gas barrier liners for spiral paper cans which can be used for packaging motor oil, paints, vegetable oils, and the like.

The laminated products of this invention per se have special utility in the packaging of poultry, meats, cheese, butter, other dairy products, fruits, vegetables, fish, and the like which are subject to deterioration from bacterial action, mold development and similar decompositional influences.

The laminated products of this invention are further illustrated in the following examples wherein the amounts of ingredients are expressed in parts by weight unless otherwise indicated.

EXAMPLE I

One surface of a film of biaxally oriented polyacrylonitrile prepared according to copending U.S. Patent application Ser. No. 377,041 was first coated with a primer and was then extrusion-coated with a medium density polyethylene. The primer was a mixture of 97 parts of a hydroxyl terminated polyester resulting from the condensation of terephthalic acid and hexamethylene glycol and 3 parts of polyisocyanate of the formula:

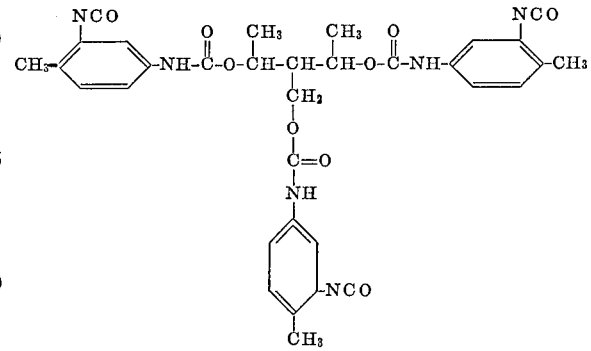

The hydroxyl groups of the polyester react with the isocyanate groups of the polyisocyanate to form urethane linkages and thus to cure the primer mixture to give it heat and chemical resistance. The polyethylene used was a medium density resin having a density of 0.93 g./cc. and a melt index of 6.5 g./10 min.

The primer was applied to the film from a 10% solution in methyl ethyl ketone and dried in a gas fired oven at a temperature of 250° F. The coating was done using a web speed of 150 ft./min. and was coated by the polyethylene at the nip of a chilled roll and a pressure roll. The polyethylene was extruded at 600° F. and the extrusion die was set to put down a 2.5 mils coating. The resulting laminate had a thickness of 3.3 mils, a tensile modulus of $0.9 \times 10^5$ p.s.i., a tensile strength of 4,000 p.s.i., an ultimate elongation of 30% and a tensile impact of 225 ft. lb./in.$^3$. The polyethylene itself at a thickness of 2.5 mils had an ultimate elongation of 500%, a tensile modulus of $0.5 \times 10^5$ p.s.i., a tensile strength of 2,000 p.s.i., and a tensile impact of 550 ft. lb./in.$^3$. A polyacrylonitrile film which had been biaxially oriented having a thickness of 0.5 mil had an ultimate elongation of 50%, a tensile modulus of $5.0 \times 10^5$ p.s.i., a tensile strength of 20,000 p.s.i., and a tensile impact of 400 ft. lb./in.$^3$.

and then the treated surface of the polyethylene was contacted with the primed surface of the polyacrylonitrile. The peel strength of the resulting laminate was found to be 2.9 lb./in. at room temperature and 1.3 lb./in. at 105° C. and the laminate remained intact even when immersed in boiling water.

EXAMPLE IV

Three types of polyethylenes were coated on 0.5 mil biaxially oriented polyacrylonitrile film by the procedure of Example I. The effects of the variation in density of the polyethylenes on the laminates were determined. The results are given in the following table:

| Material in laminate | Thickness | Tensile strength | | | Room temp. seal strength, lb./in. | Water vapor transmission, g./100 in², 90% relative humidity |
|---|---|---|---|---|---|---|
| | | Stress, p.s.i. | Load, lbs. on ½" strip | Percent elongation | | |
| Polyacrylonitrile alone | 0.5 | 20,000 | 5.0 | 50 | 0 | |
| Polyethylene (0.915 density) alone | 2.7 | 2,000 | 2.7 | 300 | | |
| Combination above 2 materials | 3.35 | 4,000 | 7.1 | 80 | | |
| Polyethylene (0.923 density) alone | 2.5 | 2,500 | 3.1 | 475 | 7.0 | 0.11 |
| Polyacrylonitrile+above polyethylene | 3.25 | 4,200 | 7.3 | 50 | | |
| Polyethylene (0.95 density) alone | 2.0 | 4,300 | 4.5 | 12 | 7.0 | 0.105 |
| Polyacrylonitrile+above polyethylene | 3.0 | 5,400 | 7.7 | 70 | 7.0 | 0.086 |

The laminate described above was heat-sealed by placing the two polyethylene surfaces against each other and heating with pressure (275–300° C. and about 25 p.s.i.). The laminate was found by the peel test to have a seal strength of 5.5 lb./in. at room temperature, an Elmendorf tear of 27 g./mil and a water vapor transmission (50% relative humidity, g./100 in.²/24 hrs.) of 0.035. The starting biaxially oriented polyacrylontrile film had no strength in the seal test when attempts were made to heat-seal it; it had an Elmendorf tear of 16 g./mil and a water vapor transmission of 0.15. The polyethylene when heat-sealed to itself in the foregoing manner was found to have a room temperature seal strength of 2.0#/in.

EXAMPLE II

A 2 mil film of polyethylene was laminated to a 0.5 mil film of biaxially oriented polyacrylonitrile film by pressing them together on a roll mill at an elevated temperature. The adhesion was achieved by means of an adhesive. The adhesive used was a blend of a copolymer of 97% by weight vinyl acetate and 3% acrylic acid and a copolymer of 72% ethylene and 28% vinyl acetate, wherein the blend was made up of about 67% of the former and 33% of the latter copolymer. The adhesive was applied to the polyacrylonitrile film from the melt at 350° F. by means of a wheel applicator. The polyethylene film (density 0.93) was contacted by the primed polyacrylonitrile film at the nip while the primer still had some tack. The laminate was found to be transparent and to have a peel strength between the layer of polyethylene and polyacrylonitrile film of 2.6 lb./in. at room temperature and 0.1 lb./in. at 105° C.

EXAMPLE III

A polyethylene film of the type described in Example II was prepared and treated with a solution of chromic acid for 15 minutes. The acid was then washed off and the treated surface was dried. The treated side of the polyethylene film was then laminated to a primed biaxially oriented polyacrylonitrile film as follows:

The adhesive used was a polyurethane made by reacting 1,6-hexamethylene diisocyanate and tolylene diisocyanate with trimethylol propane and curing with 3% of a cellulose acetate-butyrate polymer having residual hydroxyl groups. The adhesive was coated on the surface of the polyacrylonitrile film by drawing a doctor blade over the surface after the dissolved adhesive (10% by weight in ethyl acetate) had been poured onto the film. The thus treated film was dried at 125° C. for a minute

EXAMPLE V

Employing a primer system employed in Examples I and IV, a medium density polyethylene was extrusion-coated onto 0.5 mil biaxially oriented polyacryontrile film and the properties of the laminate were evaluated. The polyethylene employed had a density of 0.924 g./cc. and a melt index of 6.5 g./10 min. The laminate was also heat-sealed and the heat seal strength was determined as well as other properties for the laminates and the results are given in the following table:

| | Thickness mil. | Heat seal strength room temp., lbs./in. | Water vapor transmission, g./100 in²/24 hrs., 90% rel. humidity |
|---|---|---|---|
| Polyacrylonitrile film | 0.5 | 0 | 0.353 |
| Polyethylene film | 2.6 | 3.4 | 0.12 |
| Laminate | 3.2 | 15.0 | 0.083 |

The predicted water vapor transmision for the laminate would be equal to the water vapor transmission of the polyethylene times the percent polyethylene in the laminate plus the water vapor transmission of the polyacrylonitrile times the percent of polyacrylonitrile in the laminate or $$0.316 \left(\frac{2.6}{3.1}\right) \times 0.178 \left(\frac{0.5}{3.1}\right)$$

or 0.293 g./mil/100 in.²/day. Actually, the value was $0.083 \times 3.1$ or 0.257, this then is a 12% decrease in water vapor transmission through the laminate over that predicted and this is an apparent advantageous synergistic effect. The five-fold increase in heat seal strength of the heat-sealed laminate over the heat seal strength of the polyethylene is also an unexpected synergistic effect.

EXAMPLE VI

The laminate of Example I was folded on itself, polyethylene side down, filled with tomato catsup, partially heat-sealed in the form of a pouch around the catsup, purged with nitrogen and finally evactuated and the pouch was completely heat-sealed around the catsup. In a similar fashion, catsup was packaged in a laminate of polyvinylidene chloride and cellophane which is a commercial packaging material of accepted superior gas barrier properties. The reaction of catsup with oxygen causes it to turn brown. The foregoing pouches were stored at room temperature and the color of the contents was determined periodically. The change in weight of the original pouches was also determined. At the end of one month, the catsup in the polyvinylidene chloride-cellophane pouch was red-brown and a 10% loss in weight had occured. In three months, the same pouch had lost 27% of the original weight and the catsup in the pouch was dark brown in color. At the end of three months, the catsup in the polyethylene-polyacrylonitrile pouch was still red and a weight loss of 3% had occurred.

EXAMPLE VII

A laminate prepared according to the procedure of Example I was heat-sealed to form a pouch, the pouch was filled with an air-curing alkyd house paint and the pouch was sealed. The pouch containing the paint was stored for a year at room temperature and at the end of this time, the weight loss was negligible and the paint in the pouch was still fluid.

EXAMPLE VIII

A 50 g. sample of limburger cheese was packaged and sealed in a pouch made from the laminate described in Example I. Another 50 g. sample of limburger cheese was packaged and sealed in a 5 mil. polyethylene film pouch. The pouches were each stored at room temperature in a glass container. From time to time the odor or lack of odor coming from the pouch was determined. There was a strong odor of limburger cheese from the polyethylene pouch in fifteen days whereas, there was no odor from the laminate pouch in sixty days.

EXAMPLE IX

Mustard was stored in a pouch made from the polyvinylidene chloride-cellophane laminate described in Example VI and in a pouch made from the laminate of Example I. The pouches were treated as in Example VIII with the following resuts:

| Pouch laminate | 1 month | 3 months |
|---|---|---|
| Polyvinylidene-chloride cellophane. | Strong odor, 12% weight loss. | Strong odor, 20% weight loss. |
| Polyacrylonitrile-polyethylene | No odor, 1% weight loss. | No odor, 3% weight loss. |

EXAMPLE X

Results similar to those given in the preceding examples were obtained when polypropylene was used in place of polyethylene and when biaxially oriented polyacrylonirile film described in copending U.S. patent application Ser. No. 421,612 was used in place of the polyacrylonitrile of Example I.

We claim:

1. A laminate having excellent heat-seal strength and vapor barrier properties comprising as essential laminal (A) a biaxially oriented film of an acrylonitrile polymer selected from the group consisting of an acrylonitrile homopolymer and copolymers of acrylonitrile with up to about 5% by weight of at least one polyalkenyl monomer and (B) a film of a polyolefin, said polyolefin being a polymer of at least one alpha-olefin having the structure

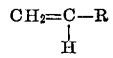

wherein R is selected from the group consisting of hydrogen and an alkyl group having from 1 to 6 carbon atoms and wherein said polyolefin is extruded in the molten state and bonded onto the acrylonitrile polymer film which has been surface-treated with an adhesive selected from the group consisting of (1) a mixture of a hydroxyl terminated polyester and a polyisocyanate, (2) a blend of a copolymer of vinyl acetate and acrylic acid with a copolymer of ethylene and vinyl acetate, and (3) a polyurethane prepared by reacting 1,6-hexamethylene diisocyanate and tolylene diisocyanate with trimethylol propane and cellulose acetate-butyrate polymer having residual hydroxyl groups.

2. The laminate of claim 1 wherein the polyolefin is polyethylene.

3. The laminate of claim 1 wherein the polyolefin is polypropylene.

4. The article resulting from the contacting and heat sealing of two polyeolefin surfaces of the laminate of claim 1.

5. A process for forming a laminated structure which comprises extruding a film of a polyolefin, said polyolefin consisting of a polymer of at least one alpha-olefin having the structure

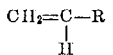

wherein R is selected from the group consisting of hydrogen and an alkyl group having from 1 to 6 carbon atoms in the molten state, and bonding said polyolefin while it is in the molten state onto a biaxially oriented film of an acrylonitrile polymer surface-treated with an adhesive selected from the group consisting of (1) a mixture of a hydroxyl terminated polyester and a polyisocyanate, (2) a blend of a copolymer of vinyl acetate and acrylic acid with a copolymer of ethylene and vinyl acetate, and (3) a polyurethane prepared by reacting 1,6-hexamethylene disocyanate and tolylene diisocyanate with trimethylol propane and cellulose acetate-butyrate polymer having residual hydroxyl groups, said acrylonitrile polymer being selected from the group consisting of acrylonitrile homopolymer and copolymers of acrylontrile with up to about 5% by weight of at least one polyalkenyl monomer.

References Cited

UNITED STATES PATENTS 2,774,702 12/1958 Smith _____ 161—254 XR
3,036,930  5/1962 Grinninger et al. _____ 117—93
3,215,580 11/1965 Benning et al. ____ 161—252 XR ROBERT F. BURNETT, *Primary Examiner.*

R. H. CRISS, *Assistant Examiner.*

U.S. Cl. X.R.

156—244; 161—231, 247, 252, 254, 256, 402